US012245299B2

(12) United States Patent
Van Buskirk et al.

(10) Patent No.: US 12,245,299 B2
(45) Date of Patent: Mar. 4, 2025

(54) TARGET DISAMBIGUATION IN A COMPUTER MEDIATED COMMUNICATION SYSTEM

(71) Applicant: Theatro Labs, Inc., Richardson, TX (US)

(72) Inventors: Guy R. Van Buskirk, Grapevine, TX (US); Jesse Alan Montgomery, Rowlett, TX (US); Kathryn Payne Torrence Shae, Dallas, TX (US); Ravi Shankar Kumar, Plano, TX (US)

(73) Assignee: Theatro Labs, Inc., Richardson, TX (US)

( * ) Notice: Subject to any disclaimer, the term of this patent is extended or adjusted under 35 U.S.C. 154(b) by 514 days.

(21) Appl. No.: 17/714,985

(22) Filed: Apr. 6, 2022

(65) Prior Publication Data

US 2023/0328810 A1 Oct. 12, 2023

(51) Int. Cl.
*H04W 76/11* (2018.01)
*G06F 40/295* (2020.01)
*G10L 15/22* (2006.01)

(52) U.S. Cl.
CPC ........... *H04W 76/11* (2018.02); *G06F 40/295* (2020.01); *G10L 15/22* (2013.01); *G10L 2015/223* (2013.01)

(58) Field of Classification Search
CPC ...... H04W 76/11; G06F 40/295; G10L 15/22; G10L 2015/223; H04M 1/27463; H04M 3/42093; H04M 2203/551; H04M 2203/555; H04M 2203/559; H04M 2250/60

See application file for complete search history.

(56) References Cited

U.S. PATENT DOCUMENTS

| 2012/0016678 A1* | 1/2012 | Gruber | G06N 5/041 704/E21.001 |
| 2015/0213382 A1* | 7/2015 | Russell | G09B 5/00 705/7.38 |
| 2016/0188565 A1* | 6/2016 | Robichaud | G06F 40/35 704/9 |
| 2019/0324780 A1* | 10/2019 | Zhu | H04L 51/216 |
| 2020/0380077 A1* | 12/2020 | Ge | G10L 15/18 |
| 2021/0118442 A1* | 4/2021 | Poddar | G06F 40/35 |
| 2021/0409234 A1* | 12/2021 | Behar | H04L 65/403 |

* cited by examiner

*Primary Examiner* — Yogeshkumar Patel

(57) ABSTRACT

A computer mediated communication system includes a plurality of communication devices, a wireless transceiver, a computer system configured to wirelessly communicate with the communication devices via the wireless transceiver and mediate communications among the communication devices. The computer system a memory coupled with a processor. The processor parses, in response to an initiator providing an ambiguous input to the computer mediated communication system requesting a communication interaction, the processor: parses the ambiguous input for information about a desired target of the communication interaction; matches the information about the desired target against maintained target data to select a list of potential targets; computes likelihoods the potential targets of being the desired target; ranks the potential targets based on their respective likelihoods of being the desired target; and disambiguates the ambiguous input by communicatively coupling the initiator with at least one of the potential targets based on the ranking.

25 Claims, 6 Drawing Sheets

600

RESPONSIVE TO AN INITIATOR PROVIDING AN AMBIGUOUS INPUT FOR A COMMUNICATION INTERACTION TO THE COMPUTER MEDIATED COMMUNICATION SYSTEM, PARSE THE AMBIGUOUS INPUT FOR INFORMATION ABOUT A DESIRED TARGET OF THE COMMUNICATION INTERACTION
610

MATCH THE INFORMATION ABOUT THE DESIRED TARGET AGAINST TARGET DATA MAINTAINED BY THE COMPUTER MEDIATED COMMUNICATION SYSTEM TO SELECT A LIST OF POTENTIAL TARGETS FOR THE COMMUNICATION INTERACTION
620

COMPUTE LIKELIHOODS OF POTENTIAL TARGETS ON THE LIST OF POTENTIAL TARGETS OF BEING THE DESIRED TARGET
630

RANK THE POTENTIAL TARGETS BASED ON THEIR RESPECTIVE LIKELIHOODS OF BEING THE DESIRED TARGET
640

DISAMBIGUATE THE AMBIGUOUS INPUT BY COMMUNICATIVELY COUPLING THE INITIATOR WITH AT LEAST ONE OF THE POTENTIAL TARGETS BASED ON THE RANKING
650

FIG. 6

TARGET DISAMBIGUATION IN A COMPUTER MEDIATED COMMUNICATION SYSTEM

BACKGROUND

In a large enterprise it can often be difficult for a communication initiating entity (the "initiator") to find and communicatively connect with a desired target to carry out communication. In an example where the initiator and the target are people, a first person (the initiator) in a large enterprise may find it difficult, cumbersome, and/or time consuming or even impossible to locate and communicatively connect for a voice, text, or other communication with a second person (the target). Conventional computer mediated communication systems can streamline the facilitation of communicative connections between an entity and one or more targets when an initiator can properly and uniquely identify the target. In this manner, computer mediated communication can reduce the technical difficulty of using communication equipment to make a communicative connection. However, even with computer mediated communications, connection accuracy may still suffer, especially in large enterprise.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 6 illustrates a flow diagram of an example method of target disambiguation in a mediated communication system, according to various embodiments.

DESCRIPTION OF EMBODIMENTS

Figure 1:
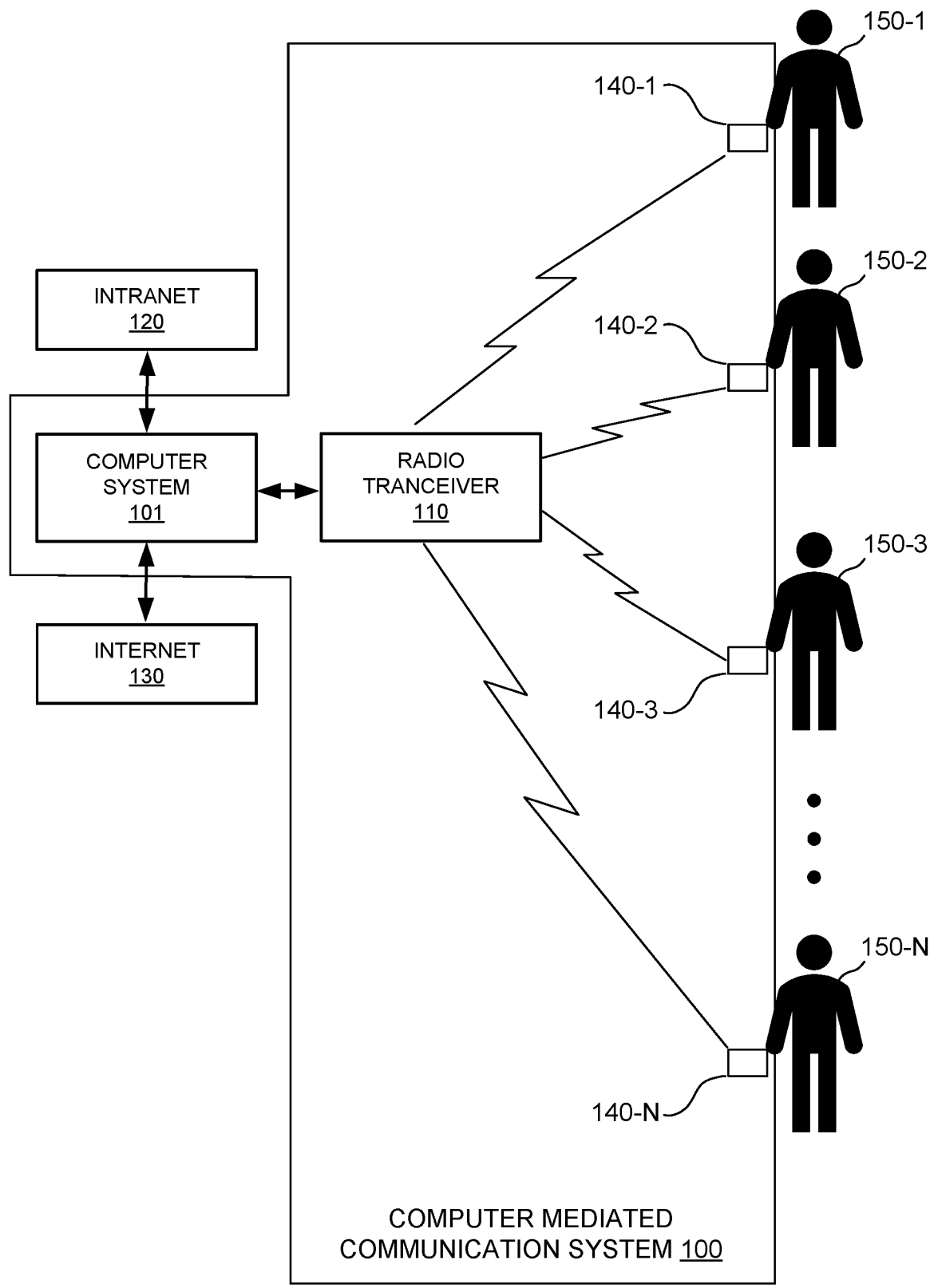
FIG. 1 illustrates an example computer mediated communication system, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

In a conventional computer mediated communication system, a commonly used method of creating a connection between users, groups, IoT devices, or other systems is to speak the name of the target destination. The mediating computer system is then able to set up a link or connection between the originating user (or system) and the target user, group, IoT device, or other system. Such a method of connecting people and/or machines is accurate and straightforward if the name or moniker is clear, understood, and unique.

A system of computer mediated communication that uses personal names or other monikers for creating a pointer to a target (e.g., for connection to a person or for a virtual channel between users or groups of users, or to other computing systems, or to other devices such as IoT devices) can be confounded if there are many targets that are not easily identified by a unique name or moniker. Often, in large retail, hospitality, or other enterprises, a person's full name is not widely known, or there are multiple employees with the same or similar first name or even the same full name. In some cases, the name of the desired contact is not known at all. In other cases, environmental noise or distortions can mask or truncate the designation of the target person or device when using verbal communication targets. As will be described herein, in such a large-scale environment it can be important to include computer intelligent methods to disambiguate targets and improve connection accuracy. Put differently, such target disambiguation assists an entity in communicatively connecting with the desired target (e.g., a single party, group or system) should the target's exact name not be known by the initiating entity for uniquely identifying the target.

The methods, computer processes, and systems described herein operate to provide target disambiguation which improves the accuracy of targeting a desired entity for communication when the input to the mediating computer system is ambiguous, incomplete, garbled, or otherwise not clear and/or not unique.

Discussion begins with a description of notation and nomenclature. Discussion then shifts to description of some an example computer mediated communication system, which includes a computer system. Various techniques for analyzing inputs, disambiguating them, and commanding communicative connections are then described. A block diagram of an example computer system, which may be used in a computer mediated communication system is then described. Operation of the example system and a computer mediated communication system will be further described in conjunction with discussion several example methods of operation.

Notation and Nomenclature

Unless specifically stated otherwise as apparent from the following discussions, it is appreciated that throughout the present Description of Embodiments, discussions utilizing terms such as "mediating," "communicatively coupling", "parsing," "matching," "selecting," "computing," "ranking," "achieving," "disambiguating," "incorporating," "employ," "implement," or the like, often refer to the actions and processes of an electronic computing device or system, such as computer system in a computer mediated communication system, The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

As used herein, the term "communication" may mean any conversation, action, activity, message, alert, visual signal, physical signal or other type of interaction between a computer mediated communication system, one or more users, initiating users, initiating systems, and the target (e.g., a user, device, grouping of users, or grouping of devices).

A "target" may be a person such as a human user of a computer mediated communication system, a group of persons, external systems, communication device(s), or IoT device(s).

A "user" may mean a system connection, an external computer connection, an IoT connection, a single human user, and/or a plurality of human users sometimes referred to as a group or group of users.

An "initiator" or "target" may refer to a person, user, employee, manager, device, device type, system, IoT device, screen, tablet, or external computer system.

A "device" may mean a mobile device (smartphone, wearable, tablet, laptop, or similar), a fixed device (display, terminal, computer, server, system, IoT module, or system component). In some embodiments, devices are used by and associated with users meaning that a reference to a device is the same as a reference to the human user of the device. In other embodiments, a "device" may be entirely machine-based, without a human user being associated.

The terms "connected" and "linked" may mean establishing a live communication (such as a live voice and/or video communication), establishing a data connection, sending a message, requesting information about the user or device, requesting the location of the user or device, interrupting the user or device, or otherwise using a computer mediated communication system to interact with a user or device. The term "connection" may also be used in conjunction with linking user to devices, or devices to devices.

The following descriptions, examples, references, and embodiments provide the necessary information for understanding the operation and processes used to mitigate the errors caused by ambiguity or distorted input information for determining the target of an intended communication, link, command, alert, or alarm. It is understood that the scope of the embodiments described herein may incorporate variations or additional forms.

Example Computer Mediated Communication System

FIG. 1 illustrates an example computer mediated communication system 100, in accordance with various embodiments. A computer mediated communication system (CMCS) 100 may be used to mediate communications and create communicative couplings between users (who may be workers, associates, employees, etc.) at an enterprise such as, but not limited to: a factory, a hospital, a convention center, a hotel, a cruise ship, school, sports arena, entertainment venue, a veterinary clinic, a retail location, a construction site, a wholesale location, etc. The communicative couplings may be for voice, text, and/or image (video and/or still) communications. Computer mediated communication system 100 includes a computer system 101 which is communicatively coupled with a radio transceiver 110, and a plurality of communication devices 140 (e.g., 140-1, 140-2, 140-3 . . . 140-N). In some embodiments, radio transceiver may be a wireless wi-fi router or operated in the frequency range of wi-fi communications. In some embodiments, as depicted, each device 140 may be associated with a human user. For example, in the depicted embodiment: device 140-1 is associated with human user 150-1; device 140-2 is associated with human user 150-2; device 140-3 is associated with human user 150-3; and device 140-N is associated with human user 150-N. In other embodiments, a device 140 may be a standalone device that is not associated with a human user. In some embodiments, for example, some, all, or none of the device 140 in a CMCS 100 are associated with a human user 150. In some embodiments, computer system 101 may be communicatively coupled with one or more of an intranet 120 (e.g., a wireless or wired local network) and the Internet 130. In operation, computer system 101 receives a communication from an initiator device 140 (e.g., device 140-2) with a request for a communicative coupling with a target user 150 and information about the requested target user 150. The communication may be received from the initiator via radio transceiver 110 in some embodiments, or by other means (e.g., via intranet 120 or Internet 130) in other embodiments. Consider a conventional embodiment, where user 150-1 is named "Guy," and the information about the target user is voice information of a user saying, "Hey Guy, how's the inventory on ten speed bicycles." In such a conventional embodiment, computer system 101 may parse the voice information for the name "Guy" and note that there is only one user 150 named Guy (i.e., user 150-1) and that Guy is associated with device 140-1. In this conventional embodiment, there is no ambiguity in the requested target, so computer system 101 mediates the communication by initiating a wireless communication between device 140-2 (which was used by the initiator to initiate the communication) and device 140-1 which is associated with user 150-1, who is named Guy. Unfortunately, there is often ambiguity that must be resolved, and in such instances a ranking system as described herein may be used for target disambiguation in computer mediated communication system 100.

As an aid in understanding the operation of the various ranking processes in target disambiguation, consider a different example where the name of target user 150 is "Bob." In this example, a user/initiator such as user 150-1 may say "Hey, Bob," into the initiator's device 140-1. Consider also, for purposes of this example, that users 150-2, 150-3, and 150-N may all have the first name of "Bob." This provides an example of a potentially ambiguous input by an initiator for a communication interaction in CMCS 100. It is understood that in other ambiguous inputs "Bob" could be replaced by any word, phrase or machine instruction that is distorted, corrupted, or ambiguous whether the input is from an initiator person using CMCS 100 for communication or from an initiator machine connected to CMCS 100 and attempting to initiate a communication. Many of the techniques described herein to improve the ranking of an output (i.e., a ranked list of potential targets will use information collected by CMCS 100 to understand the context of the initiator and/or context about a potential target of the initiator). Among other things, context information may include, but is not limited to: location, motion, time of day, day of week, season of year, initiator history, initiator role/function, group memberships of initiator or target, or target role/function, personal characteristics to include pre-populated information and information gathered through system interaction with the users (e.g., personal attributes, wardrobe, personal preferences, etc.), and how the user is behaving according to other data gathered by CMCS 100. Tables 1 and 2 provide some examples of context information.

Table 1 illustrates an example list of characteristics for the personal characteristics that may be associated with each identified user of CMCS 100.

TABLE 1

Example Personal Characteristics

| Characteristic Name | Bob 150-2 Characteristic | Bob 150-3 Characteristic | Bob 150-N Characteristic | Source |
|---|---|---|---|---|
| User ID | 12345 | 34567 | 56789 | System Assigned |
| Full Name | Bob Wheeler | Bob Walker | Bob French | Pre-loaded |
| Gender | Male | Male | Male | Pre-loaded |
| Pronoun | Mr. | Mr. | Sir | Pre-loaded |
| Preferred Language | English | English | English | Pre-loaded or Derived |
| Role | Security Manager | Facilities Superintendent | Housekeeping Leader | Pre-loaded or Derived |
| Title | Manager | Superintendent | Director | Pre-loaded or Derived |
| Expertise | Shoplifters | Forklifts | Customer Relations | Pre-loaded or Derived |
| Primary Department | Security | Facilities | Operations | Pre-loaded or Derived |
| Secondary Department | Front Office | Maintenance | Services | Pre-loaded or Derived |
| Tertiary Department | Shoes | Hardware | Restaurant | Pre-loaded or Derived |
| Personal Characteristic 1 | Tall | Blond | Long Hair | Pre-loaded or Derived |
| Personal Characteristic 2 | Facial Hair | Black Pants | Uses a cane | Pre-loaded or Derived |
| Personal Characteristic 3 | Dark Hair | Curly Hair | Funny | Pre-loaded or Derived |
| Personal Characteristic 4 | Blue Shirt | Green T-shirt | Red Shirt | Pre-loaded or Derived |
| Personal Characteristic 5 | Western Boots | Big Smile | Slender | Pre-loaded or Derived |

Table 2 illustrates an example list of system use characteristics for users of CMCS 100. CMCS use characteristics in Table 2 are derived from data and metrics collected or computed by computer mediated communication system 100 but may come from other sources. The characteristics illustrated in Table 2 do not require user intervention.

TABLE 2

Example System Use Characteristics

| Characteristic Name | Bob 150-2 Characteristic | Bob 150-3 Characteristic | Bob 150-N Characteristic | Source |
|---|---|---|---|---|
| Currently Identified on the computer mediated communication system (CMCS) | Yes | No | Yes | Derived |
| Previous CMCS Usage | Yes | Yes | Yes | Derived |
| Aggregate CMCS Time in Last Interval | 40 hr/wk | 20 hr/wk | 52 hr/wk | Derived |
| Most Recent Contact | 78923 | 89731 | 41321 | Derived |
| Recency of Contact | 1 min | 2 hr | 12 min | Derived |
| Frequency of Contact | List | List | List | Derived |
| Volley with Others | List | List | List | Derived |
| Initiator of Last Message Played | 98765 | 4573 | 28176 | Derived |
| Initiators of All Messages Played | List | List | List | Derived |
| Initiator of Last Request & Response | 64735 | 64735 | 2325 | Derived |
| User Accepting the Last Request | 23245 | 23245 | 4167 | Derived |
| Related Departments | Receiving | Parking Lot | Guest Services | Derived |
| Location of Users | List | List | List | Derived |

The collective characteristics (examples of which are provided in Table 1 and Table 2), when available, may be used by a decision engine (see e.g., decision engine 390 of FIG. 3) to compute the likelihood of a potential target of being the desired target of an initiator, and to adjust the ranking of the potential targets with respect to one another when the decision engine computes a ranked list of the potential targets. Tables 1 and 2 show a name for each characteristic associated with a particular user, examples of three identified users (Bob 150-2, Bob 150-3, and Bob 150-N), and the source of the characteristic—that is, whether the characteristic was system assigned, pre-loaded, derived, etc. It is understood that the three Bob's in Tables 1 and 2 were used as an example and that, in practice, such tables would be expanded to include characteristic information for all users on the computer mediated communication system 100 regardless of whether their names are ambiguous or unique.

The "Source" column in Tables 1 and 2 identifies where computer mediated communication system 100 obtains the example user characteristic. Some characteristics may be manually entered into CMCS 100 verbally, through a screen interface, or by linking to external systems or databases. These manual or machine loaded entries are identified in the Source column as "Pre-loaded." Pre-loading may be accomplished by the enterprise, a manager, or the individual user. Typically, pre-loaded data does not need to be re-entered when a user is identified by CMCS 100. In some cases, personal characteristics may change daily or in an unscheduled fashion, and the personal characteristic will need to be either manually or dynamically updated. For example, Bob 150-2 may have worn a red shirt yesterday and today is wearing blue shirt. The entry in Table 1 for personal characteristics may be updated for Bob 150-2 using various means such as: entering the new shirt color via a screen or verbal command, setting CMCS 100 policy to request a shirt color of Bob 150-2 upon identification that Bob 150-2 is active within CMCS 100, using a camera system to identify a shirt color of Bob 150-2 upon identification of Bob 150-2 by facial recognition, using a camera system to identify a shirt color of Bob 150-2 or during employee clock-in, and/or by using a camera on communication device 140-2 to allow Bob 150-2 to capture an image of his shirt. Other personal characteristics such as department assignments or role assignments may be manually entered or machine-derived from external systems, the enterprise, a manager, or remote sources.

In some cases, the characteristic is a list of other user IDs. For example, the location of other users of CMCS 100 is a list of known users and their relative or absolute location. In another example, the list may contain the user IDs for every source that delivered a message to the instantiating user.

In the examples shown in Table 3, the quoted text in the Command column represents the command spoken, entered into CMCS 100 via a screen, or entered via a machine interface. The result is derived from processing the example information shown in Tables 1 and 2 via processes 300 and 400 described in FIGS. 3 and 4 respectively. In some cases, the result can be explicitly derived from the information in Tables 1 and 2. In other cases, the resulting target(s) are not explicitly shown in the Tables 1 adn 2 and would be a user ID not shown in the example or group of user IDs extracted from the full enterprise set of users. Table 3 uses the case where user 150-1 is the initiator.

TABLE 3

Example Commands and Resulting Communicative Couplings

| Command | Resulting Target(s) |
|---|---|
| "The last person I called", "Last connection", "Reconnect" | Make a connection to User ID 78923 |
| "Respond to message" | Make a connection to User ID 98765 |
| "Contact the requestor" | Make a connection to User ID 64735 |
| "Contact the acceptor of the request & response" | Make a connection to User ID 23245 |
| "Hey Buddy" | Primarily uses Frequency of Contact and Volley with Others to determine their "Buddy" |
| 'Call Bob" | Primarily uses Frequency of Contact, Volley with Others, and departmental relationships to return Bob 150-3 |
| "Bob" | Primarily uses Frequency of Contact, Volley with Others, and departmental relationships to return Bob 150-2, however the ASR 214 would return less confidence requiring the decision engine 390 to weigh additional factors before returning Bob 150-2 |
| "Bob in hardware" | Primarily uses current location, role, and departmental assignment to return Bob 150-3 |
| "Bob near me" | Primarily uses current location and relative location to return Bob 150-2 |
| "Bob with the red shirt" | Primarily uses the personal characteristic of shirt color and name to return Bob 150-N |
| "Bob with long hair" | Primarily uses the personal characteristic of hair length to return Bob 150-N |
| "Curly Bob" | Primarily uses the personal characteristic of hair length to return Bob 150-N |
| "The tall guy in the shoe department" | Primarily uses the characteristics of height, location, department, and role to return Bob 150-2 |
| "The paint expert working in hardware" | Primarily uses the characteristics of expertise, location, department, and role to return Bob 150-3 |
| "The happy guy with black pants" | Primarily uses the characteristics of gender, pant color, and other personal characteristics such as "Funny" or "Big Smile" |
| "Re-connect me" (to the last conversation) | Make a connection to User ID 78923 |
| "The manager in men's shoes" | Primarily uses the characteristics of title, role, department, and location to return Bob 150-2 |
| "Security near the loading dock" | Primarily uses the characteristics of role, department, and location to return Bob 150-2 |
| "The store manager at Southlake" | Primarily uses the characteristics of title, role, department, and location (which may be remote) |
| "All hardware employees" | Primarily uses the characteristics of title, role, department, and location to return a list |
| "The freezer temperature should be colder" | Identifies a remote system that controls freezer temperatures |

In the case of mediated verbal communications between users in a computer mediated communication system 100, an initiating user (e.g., user 150-1) may know only the first name of the person they wish to connect with such as "Bob." In a large-scale environment there are often several "Bobs," as discussed, and if CMCS 100 is limited to making connections by only obtaining the first name of a target, it may be impossible or difficult to reach the intended party if the initiator does not know the full name. Some legacy systems might simply play a list of employees whose name begins with "Bob," but if the initiator does not know the last name, the list is not helpful. Also, in today's high-speed environment, listening to long lists of potential targets or navigating a "phone tree" structure of questions and answers is not well tolerated. In order to speed the connection and improve the accuracy of communicative connection to the desired target party, computer system 101 described herein, disambiguates by applying policy from data collected by the computer mediated communication system 100 to one or more analytical processes to converge on the desired target or derive a ranked list of potential targets for presentation to the initiator.

In one example, an initiating user 150-1 wanting to get connected to "Bob" within a large enterprise might say, "Hello Bob." A traditional system might respond with list of "Bobs" or might even suggest the most frequently contacted "Bob" from that user. These basic techniques are useful at times, but do not sufficiently solve the larger problem of getting connected to the targeted person quickly and accurately. An intelligent computer system 101 can make use of the data gathered and maintained by a computer mediated communication system 100 designed to track usage, location, behavior, role and function of users, and personal attributes of users or devices. By exploiting integrated data, computer mediated communication system 100 can use computer weighting and policy metrics (of an organization which employs CMCS 100) to automate a communicative connection with the appropriate "Bob" accurately, with high confidence; or can provide an optional list the most likely potential targets rather than a conventional list of all of the potential targets. This facilitates an improvement in the user experience (versus a conventional system) by achieving a link or connection to the desired target with as little information as possible from the initiator, and as fast as possible.

It is understood that not every parameter or criterion tracked or gathered by CMCS 100 need be used by an intelligent disambiguation algorithm to determine the likelihood of a target user based on the input of the initiator. An intelligent disambiguation algorithm may use one, or all, or any number of the criteria listed below to make a likelihood estimate. Likelihood estimates may be associated with a confidence metric for more accurate ranking of the possibilities or initiating optional alternatives. If all confidence measurements are low, additional metrics and historical data may be added to the decision criteria as directed by the computer policy. The final likelihood estimate may indicate sufficient confidence to directly connect the initiator to the target, or the confidence may be such that the caller is presented with options for selecting the desired target user.

The computer mediated communication system 100 described herein uses some or all of the available criteria to take a vague set of identifying information from an initiator to establish a pool of potential target users. The intelligent disambiguation algorithm then ranks the target pool by likelihood and confidence of being the desired target and assigns a numerical ranking level to each possibility. A matching algorithm then either connects the initiator to the target or provides a more limited list of most likely options for connection or interactions (the more limited list being pared down from a larger list).

In the figures and descriptions that follow, it is understood that not every procedure may be necessary, that some procedures may be skipped or their sequence changed depending on the nature of the ambiguous input and/or based on the number and dimensions of the output option list being formulated. For simplicity, many of the embodiments that follow use an example of one person (often referred to as an "initiator") calling another person (often referred to as a "target"). It is understood that in these examples, persons could be replaced by devices, IoT devices, or external computer systems; hence, initiators or targets may be users, IoT devices, computing machines, point-of-sale devices, screens or displays, call buttons, groups of users, or Internet connections.

Figure 2:
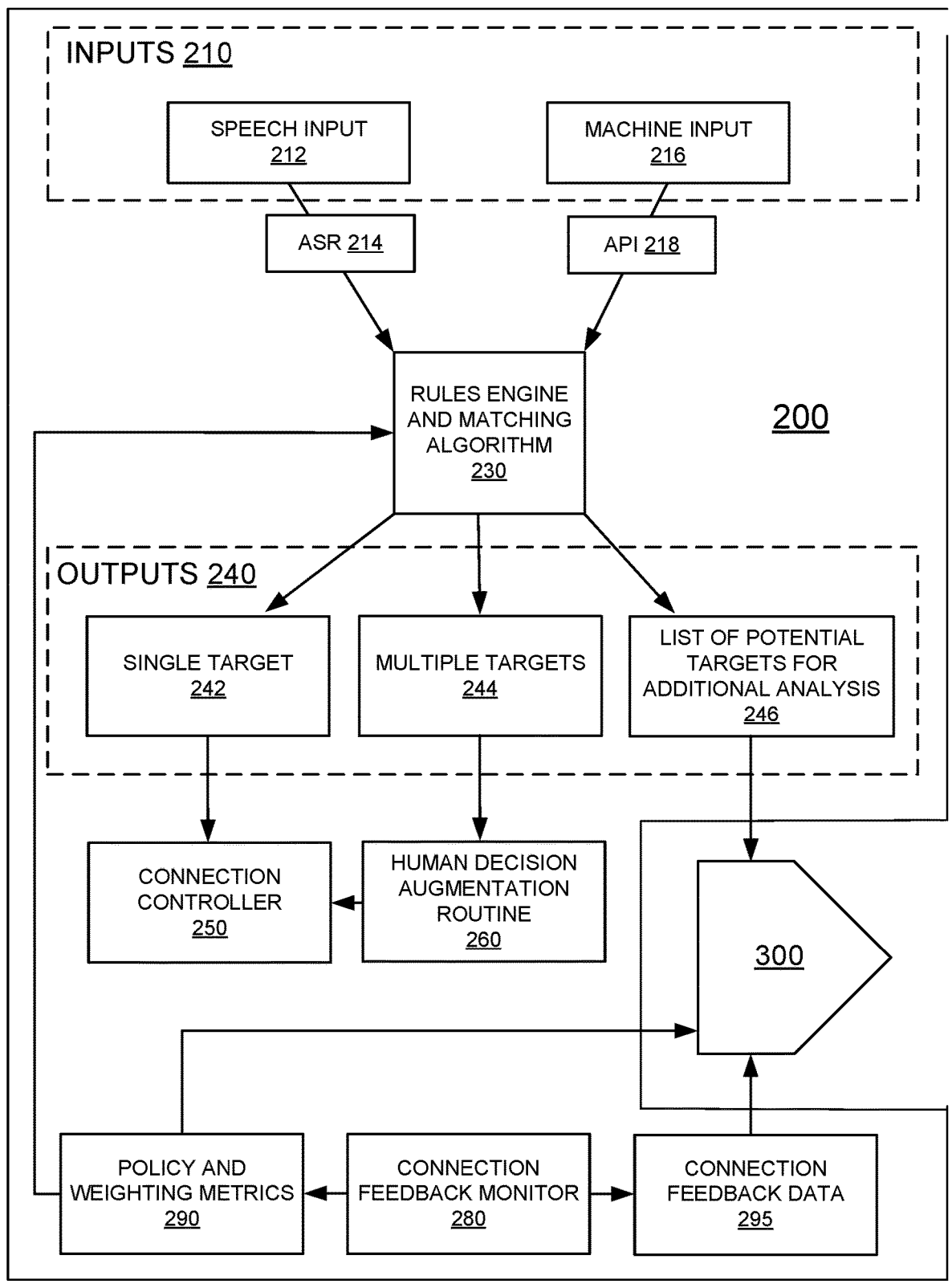
FIG. 2 shows a block diagram of example inputs and outputs surrounding a matching algorithm that operates to disambiguate desired targets from ambiguous inputs, in accordance with various embodiments.

Example Techniques for Input Analysis, Disambiguation, and Commanding Communicative Connections FIG. 2 shows a block diagram 200 of the example inputs 210 and outputs 240 surrounding a matching algorithm 230 that operates to disambiguate desired targets from ambiguous inputs, in accordance with various embodiments. FIG. 2 shows a rules engine and matching algorithm 230 being fed inputs 210 from either a speech input 212 or a machine readable input 216. In some instances, an input 210 may be ambiguous in that CMCS 100 cannot definitely determine from the input 210 a single desired target to which to communicatively couple the initiator of the input 210.

In embodiments, where the input 210 is a speech input 212, the speech input 212 is processed by an Automatic Speech Recognition (ASR) system 214 whose output is fed to the rules engine and matching algorithm 230. When targeting users, groups, IoT devices, or external systems, inputs can come from either human speech or from a machine input such as a smart device screen or external system. In either case, the information describing the target may be unclear, garbled, distorted, not unique, or otherwise ambiguous.

In embodiments, where the input 210 is a machine readable input 216, the readable input 216 may originate from a machine, IoT device, or an external system. A machine readable input 216 is processed through an Application Programming Interface (API) 218 whose output is fed to the matching algorithm 230.

The rules engine and matching algorithm 230 applies policy, rules, and weighting factors in conjunction with input data and then attempts to match the analyzed input information to a list of possible targets.

In the case of speech input 212, the ASR 214 converts the speech input into a machine-readable output using a lexicon of expected words, phonetics, and metadata such as weighting factors for specific phrases, words, and phonemes. The ASR 214 also determines the confidence in deciding the possible target options from a list of candidate translations from speech to machine readable language performed by the ASR 214. The output of the ASR 214, which may be a list of possible matches, each with a corresponding confidence measurement estimation, is sent to the matching algorithm which determines, based in policy, if the output word or phrase from the ASR 214 is unique or ambiguous.

The confidence estimate produced by the ASR 214 is one indication of uniqueness. The spread between the confidence estimates is another indication of uniqueness. For example, if the confidence estimate for one word is high and the other potential words are relativity much lower, the word with the high confidence and a large spread between the next lower confidence estimate may be considered unique and of high quality. Thresholds for the height/level of a confidence estimate and/or a spread between a high estimate and the next lower estimate may be used as determinations of uniqueness by a matching algorithm 230. If the matching algorithm 230 determines the output from either ASR 214 or the API 218 is unique and matches one of the stored targets, the matching algorithm indicates a high confidence level and outputs the single target 242. The single target command is then sent directly to the connection controller 250 to establish the connection. The matching process is the same for machine inputs 216 through the API 218 for inputs that are determined to be unique and matching.

In the case of the matching algorithm 230 determining that a list of matches is possible, and the list is short, and if the policy controlling that short list indicates the list requires a person to decide the most appropriate target, the algorithm will output the short list of targets list 244. The short list 244 is determined and is then sent to a human decision augmentation routine 260, which allows a user, manager, other person, or computing system to "hear or see" the list and select the final identification of the target. The matching process is the same for machine inputs 216 through the API 218 for inputs that are determined to be multiple possible targets requiring human decision making.

Figure 3:
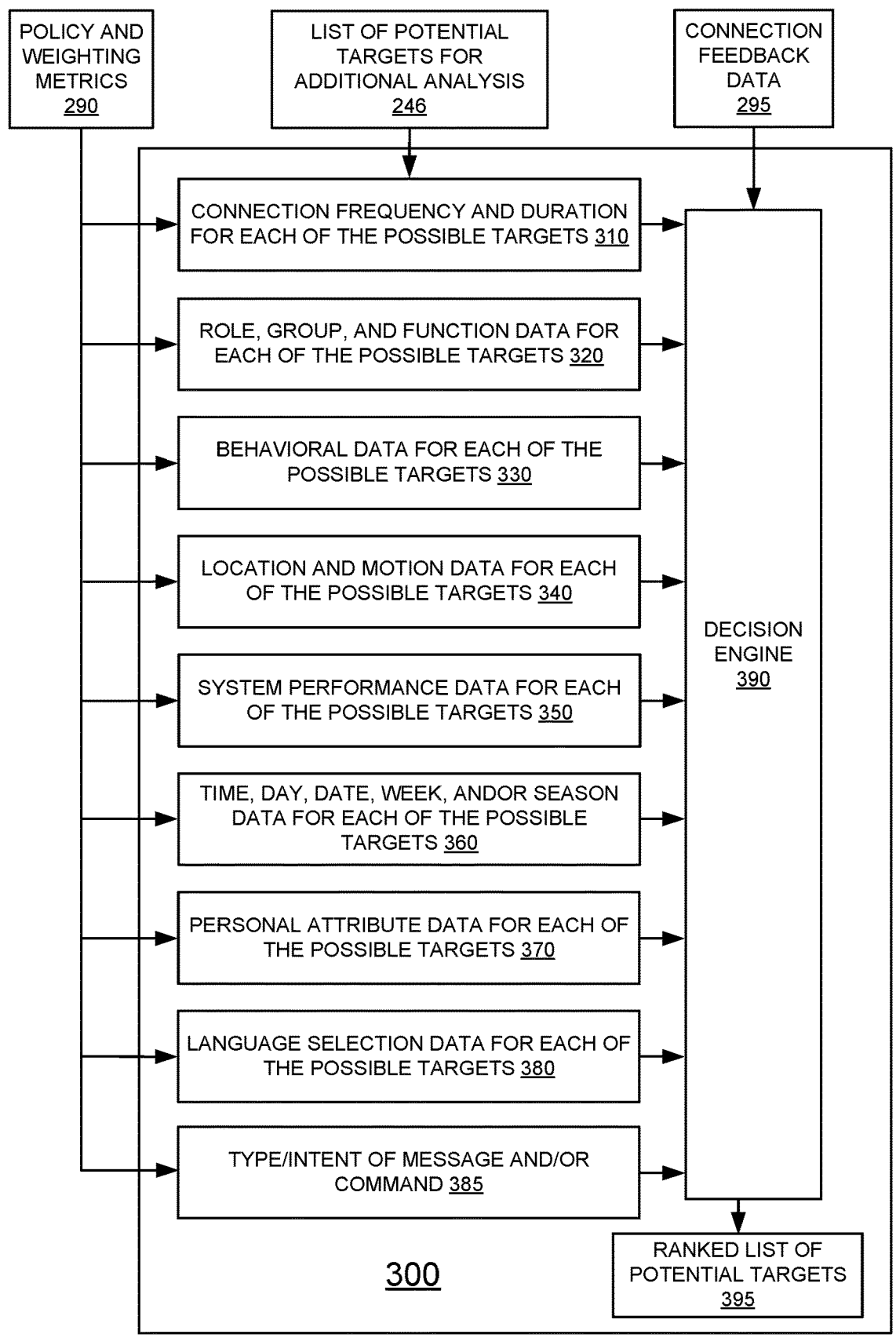
FIG. 3 shows some examples of analytical methods used to rank a list of possible targets using policy, weightings, feedback, and a decision engine, in accordance with embodiments.

In the case of the matching algorithm 230 determining that there is a list of potential targets 246, and if the policy controlling that list (e.g., a size-of-list threshold) indicates that further processing should be applied to resolve a unique target, the matching algorithm 230 will output the list of potential targets for additional analysis 246 which is sent to process 300 (of FIG. 3). The forwarding process is the same for machine inputs 216 through the API 218 for inputs that are determined to be a list potential targets with corresponding policy indicting that further processing could determine the most appropriate target or could reduce the size of the list to be less burdensome for review/selection by the initiator.

In some embodiments, the difference between a short list of multiple targets 244 and a list of potential targets for additional analysis 246 is determined by a preset or enterprise customizable threshold. Consider an example where the threshold is set at three potential targets. In such an embodiment, when rules engine and matching algorithm 230 returns two or three potential targets these potential targets may be considered "multiple targets 244" and processed by human decision augmentation routine 260. Following the same example where the threshold is three potential targets, when rules engine and matching algorithm 230 returns four or more potential targets, these potential targets may be considered a "list of potential targets for additional analysis 246" and forwarded to process 300 as inputs for additional analysis.

In all cases, where any input results in selecting a target connection, the connection feedback monitor 280 receives additional information from CMCS 100 about the effectiveness and correctness of the chosen target. Connection feedback monitor 280 may use information such as back-and-forth conversation data (sometimes called volleys), connection frequency, connection durations, failed connection information, immediate disconnects, re-start of a similar connection attempt within a short period of time, the connection time was too short based on prior similar connections, or other feedback either speech based or based on other computer feedback mechanisms. The connection feedback monitor 280 dynamically adjusts decision policy and match weightings through the policy and weighting metrics module 290.

Policy and weighting metrics module 290 uses historical information combined with current feedback metrics from connection feedback monitor 280 for making adjustments to its computer policy and weighting metrics. Subsequent use of updated policy and weightings can then be compared to prior performance to determine if an improvement in targeting has been accomplished. The connection feedback monitor 280 allows for Bayesian or other analysis of connection data and incremental adjustments/improvements to the policy and weighting metrics of module 290.

Data is collected from the connection feedback monitor 280 by monitoring operation of CMCS 100 and or by searching storage mechanisms and databases of CMCS 100. The historical data 295 collected in connection feedback monitor 280 is also used by the policy and weighting metrics module 290 for use in adjusting the criteria, priorities, and weightings in the matching algorithm 230. Feedback data 295 from connection feedback monitor 280 can also be used to adjust threshold and confidence metrics of the ASR 214.

FIG. 3 shows some examples of analytical methods used to rank a list of possible targets using policy, weightings, feedback, and a decision engine, in accordance with embodiments. FIG. 3 shows an example of some procedures for further analysis of potential targets 246 of FIG. 2 which are passed to process 300 of FIG. 3. It is understood that FIG. 3 describes a set of possible procedures, characterizations, and ranking methods which may occur in a different order than shown in the example. Each procedure may or may not be used based on the content of the information delivered provided as input from process 200. The policy and weighting metrics of module 290 tune the process in FIG. 3 to best identify the desired target based on information from the connection feedback monitor 280 and the historical data of connection feedback data 295.

The list of potential targets is passed to the array of ranking processes for determining the likelihood of each possible choice. Each separate analytical process then outputs a likelihood metric and weighting factor to the decision engine 390. The decision engine 390 sorts and analyzes the output from each reporting analytical process 310-385 to arrive at a ranking of possible targets and an associated confidence metric for each one.

The decision engine 390 uses a formula in the form of Equations 1-4 illustrated below:

$$P1*W1*C1=R1 \quad \text{Equation 1}$$

$$P2*W2*C2=R2 \quad \text{Equation 2}$$

$$P3*W3*C3=R3 \quad \text{Equation 3}$$

$$Pn*Wn*Cn=Rn \quad \text{Equation 4}$$

In Equations 1-4:
P is the computer policy weighting and control metric;
W is the weighting metric for the specific characteristic being evaluated;
C is the confidence metric passed from ASR 214 or API 218; and
R equals the resulting ranking position.

The computer policy, P, can be manually set by the enterprise that is operating CMCS 100 manually set for an initial condition, or dynamically adjusted by using system historical data and connection feedback data. Dynamically adjusting the policy weighting metric is a machine learning technique utilizing connection feedback data 295 collected from the connection feedback monitor 280. Similarly, the weighting factors, W, can be manually set by the enterprise operating CMCS 100, manually set for an initial condition, or dynamically adjusted by using system historical data or connection feedback data. There may be as many items in the ranked list as there are elements in the input list, hence, R1, R2, R3, ..., Rn. Ranking metrics are normally unique and easy to arrange in descending order or there may be duplicate metrics which indicate an equal ranking for those elements.

Users of CMCS 100 tend to have connections with the same set of people, groups, machines, or friends. Knowing the frequency of connections is a useful criterium in the algorithm for computing the most likely target of the potential targets (or to rank a potential target's likelihood versus one or more other potential targets). Past connection data 310 applies to frequency and duration of connections and may include the number of times a communication occurs between one user and another, the number of volleys between users, or it may include the frequency of a group or the entire set of users to another specific user. For example, if one manager, Bob, is frequently contacted by multiple users, then if a given user asks for Bob and there more than one Bob on CMCS 100, it is likely that the given user wants to connect with same Bob as everyone else. Frequency of connections may further include all types of communications such as messages, requests, or announcements and may pertain to human users or other intelligent devices.

Similarly, the recency of communications is also a criterium which may be used by the decision engine 390 to determine a ranking metric when a unique identification is not presented to CMCS 100. In block 310, another related criterium for determining likelihood of a target is duration-of-communications. Lengthy connections often indicate a greater likelihood of the current attempted target destination. While duration information is useful, in some embodiments, the back-and-forth "volley" count or connection frequency is additionally or alternatively used as a metric in block 310 for determining target likelihood.

Another criterion of the connection data in 310 includes if the potential target pool includes a user that has recently left a message for the initiating party. Messages often trigger other reasons to connect with someone or it may be that the connection is a response to the message left. Analyzing the correlation between the time a message was listened to and the time the user attempts to contact someone in the potential pool of users can help determine the likelihood of the target person.

Another type of connection data indicated by 310 comes from knowing the users that have either initiated or responded to a "request & response" function and when they responded. "Request and respond" is a process where requests are sent to one or more destination devices/users and one or more of the destination devices/users responds in a "ready" type of action as determined by availability or willingness of a user to respond. People or devices recently engaged in request and response activities are actively participating in tasks which sometimes require additional communications for completion. Someone who has recently initiated a request & response event is more likely to get a call from others who hear it. Someone who has recently responded to a request and response event is more likely to get a call from others who were responding to the request. Analyzing the correlation between the time a request was initiated and the time the user attempts to contact a target in the potential pool of targets helps determine the likelihood of the desired target. Similarly, analyzing the correlation between the time a response was initiated and the time the user attempts to contact someone in the potential pool of users can help determine the likelihood of the desired target. Likewise, the location or motion of an originator initiating or responding to a request & response event may be used by the algorithm in computing likelihood and confidence of the potential target.

The behavioral data 330 for a target user might include a metric for has-the-target-ever-used-the-system. Sometimes names or target destinations are established in a system, but the target has never connected with CMCS 100 or is identified as having never used CMCS 100. In this case, we can nearly eliminate that target name option from the output option by assigning a much lower match likelihood metric for that target. Once that target is using CMCS 100, the ranking for possible target is increased.

A similar behavioral criterion of behavioral data 330 for a user includes how-recently-a-target-has-been-identified-on-the-system. If the potential target has not been recognized by CMCS 100 in some time, it is less likely that they would be the target of a communication or connection. Conversely, if a target is a regularly identified on CMCS 100, they are more likely to be the desired target. The likelihood algorithm uses both recency and frequency of system use as part of the calculation of a probable target user.

Related to the above criterion is behavioral data 330 describing how-long-a-target-has-been-identified-on-the-system. This is the cumulative time of knowing the identity of a target on CMCS 100 in an interval determined by the computer policy of the likelihood algorithm. A target that spends a lot of time active on CMCS 100 is more likely to be the desired target than a target that spends short shifts on CMCS 100 or has little composite time logged.

Role, group, and function data 320 is another criterion indicating the likelihood of the desired target. If a user or device has an attribute of being registered to the same department as the initiating user, it is more likely that the same-department user is the target connection. Some users are members of several departments which provides additional information for the intelligent algorithm to compute the likelihood and confidence of the potential target. In some cases, there are frequent communications between specific users in separate departments or groups and the intelligent algorithm uses the historical information provides to compute likelihood estimations. Additionally, the intelligent system can determine the amount of inter-departmental communications that normally takes place and use that information as an additional criterion for ranking the pool of potential targets. Adding time-of-day data 360 and location and motion data 340 improves the likelihood estimate for the possible target. The interaction between users or groupings of users by correlating to the historical database of logged events at a specific time, day, week, month, and/or season data 360 improves the accuracy of ranking of likely candidate targets and computing the confidence of the ranked list. Time-of-day can also be correlated with individual shift times, or time-clock information which is an indicator if a particular user is likely to be the target of a call or message. For example, a user who is scheduled to be on-shift but has not clocked in or identified themselves as an active user of CMCS 100, has a greater likelihood of being a target than someone who was not scheduled to be on-shift at that time.

Similarly, in data 320, the role of a user (e.g., manager, facilities maintenance, register operator, product picker, security, alarm sensor, fire sensor, etc.) may be used by the intelligent algorithm as criterion for ranking the pool of potential target users and determining a likelihood metric. It is common for people in similar roles to connect with others in the same role. Additionally, CMCS 100 may use historical data to determine if one role connects with a different role with significant frequency, thus allowing the intelligent algorithm to better use the role criterium for evaluating the likelihood of a potential target across the spectrum of roles in the enterprise. The function of a device is also useful in ranking potential targets. An example might be that if a person has the role of "maintenance tech," and issues a speech command saying something ambiguous like "check temps," the role of the user would help prioritize checking the temperatures of the freezers as opposed to targeting "Chuck Timms."

The location data 340 of an initiator may be a valuable criterium for prioritizing the likelihood of a target user. For example, someone initiating a connection from an area near a locked cabinet may frequently be calling a manager with access to that cabinet. The intelligent algorithm may use the initiator's location in determining the likelihood of the desired connection across the potential pool of connections.

Similarly, the location data 340 of a potential target may be a useful criterium for prioritizing the likelihood of a target user. For example, if it is common for a register operator to request price information from the hardware department, the intelligent algorithm may use the potential target's location in determining the likelihood of the desired connection across the potential pool of connections. Location can also be used to eliminate possible targets from the likelihood set if the potential target is too close. For example, if a specific user is calling Bob, and Bob is within a few feet of the specific user, it is unlikely that the specific user is calling for the Bob who is next him, hence that Bob can be dropped down in the likelihood ranking. Motion data 340 of a potential target can also be used to refine the likelihood computation for the potential target. In one example, if a user at a checkout kiosk is trying to contact the ambiguous Bob, the motion data 340 might prioritize the Bob who is always helping with customer carry outs or price checks.

Language selection 380 may also indicate the likelihood of the potential desired connection. A user who uses a particular language (e.g., Spanish, French, Italian, German, etc.) on CMCS 100 is more likely to desire a connection to someone speaking the similar language. Language criteria can assist the intelligent algorithm in determining the likelihood and confidence of the desired connection across the potential pool of connections.

Personal attribute data 370 of a person can also be useful in ranking targets because people frequently are aware of how others appear or act, even if they do not know their names. These attributes can be input into CMCS 100 via a screen interface, a spoken interface, or a correlation with video information captured when the user is recognized by CMCS 100 as active. Collection of personal attributes may also be collected by querying peers or associates to improve the identification of an individual in a pool of potential targets. Personal attributes may, in some embodiments, include physical attributes of a user. Physical personal attributes may be innate to the person of the user (e.g., height) or transient such (e.g., clothing being worn).

For example, a user may describe themselves as tall, short, long-hair, blond-hair, brown-hair, crewcut, balding, or with mustache, among other attributes. In this example, by using the personal attribute data 370, it may be possible to reach the desired target by including one or more of the physical criteria known by CMCS 100. It may also be possible to enter temporary characteristics such as shirt color, pant color, or shoe descriptions. For example, Bob may be wearing a blue shirt today. In this instance, a user could call "Bob with the blue shirt" and reach the desired target. In another example, the initiating user may not even know Bob's first name. By saying some known attributes about Bob, CMCS 100 may be able to push the connection to the desired users to the top of the ranking list by attributes alone. For example, if an initiating user does not know the name of the person they are desiring to connect with, they may use a set of attributes such as "tall guy with blue shirt in the facilities department," or "the hardware expert with long brown hair." The intelligent system then uses personal attribute data 370 plus role, location, and function data 320 to prioritize the ranking of the most potential target candidates. Other criteria from other analysis modules are also used in decision engine 390 to determine the most likely candidate(s) for targeting.

System performance data 350 can also contribute to the ranking of ambiguous targets. In one example, a high background noise level might degrade the performance of the ASR 214 but may also indicate that the user is targeting someone who is frequently targeted from the noisy area. In another example, signal strength may decease significantly if the user enters a vault or refrigerated area, hence performance data 350 of CMCS 100 would provide additional information about the location or activities of the user and could correlate with selecting the most likely target from the list of potential targets or in ranking of the potential targets versus one another.

System performance data 350 may also indicate the device type, which may be a useful piece of information for determining the correct target. In one example, a user may be attempting to contact a manager, and it is likely that a manager uses a smart device. Knowing the device type is a useful metric for the decision engine to determine the most selecting the most likely target from the list of potential targets or in ranking of the potential targets versus one another.

The intent of a command or message 385 is useful for determining the potential target likelihood and ranking. Intent is determined and attributed by the type of command used or, in the case of spoken language, detection of keywords and key phrases. In one example, using a command that expects an immediate response from a target would raise the probability that the target is currently using CMCS 100, hence possible targets not currently on CMCS 100 would be pushed down the ranking list. For example, a command issued that expects a user to assist a customer with a package pick-up would raise the target ranking for users near the assistance location, known to be in a group that assists customers, and/or has a role that might fit the action anticipated by the command.

Conversely, the type of a command or message in 385 may be an informational message which would go to a target using CMCS 100 or that would use CMCS 100 in the future with about equal likelihood, hence the potential target would not be pushed down the ranking list by the intent metric. Other examples include raising the ranking for messages that contain price questions for potential targets like managers, cashiers, or inventory/pricing systems or lowering the ranking for security personnel when the intent of the message is a facility or pricing question.

Once the applicable set of disambiguating processes are complete and the set of likelihood metrics are compiled, policy and weighting metrics module 290 applies a policy and weighting metric to each separate likelihood metric. These weighting metrics may be pre-set by manual input to CMCS 100 or may be computed using policy, data, and history within CMCS 100. Manually input weighting metrics may be dynamically adjusted in a similar fashion using policy, data, and history within the computing system. The history component of the data refers to not only the usage and connection-pattern history, but also to the history of feedback (i.e., connection feedback data 295) of past connection or link attempts.

Computer mediated communication system 100 learns if it is making the right choices and computing accurate confidence or weighting metrics by gathering feedback from user-system interactions using the connection feedback monitor 280 and also storing the results in database of connection feedback data 295. In one embodiment, a critical element of feedback is if the algorithm connects an initiator to what CMCS 100 determines is the desired target and the initiator terminates the connection before a typical interaction takes place. The behavior of a non-typical interaction can be compared to dialing a wrong number in a traditional telephone system and establishing a connection that lasts only a few seconds. In other words, the behavior of a non-typical interaction can be taken as feedback that CMCS 100 incorrectly determined the desired target. Connection feedback monitor 280 uses connection timing as one indicator of target likelihood.

Another metric of correct connection uses automatic speech recognition (ASR) for analyzing the initial part of the call looking for common wrong-number words such as "sorry", "I did not mean . . . ", "wrong", "wrong person", "wrong number," or other such terms indicating a connection was made to the incorrect party. Detecting common "wrong-number" words near the beginning of an abnormally brief conversation is a likely indicator that the destination choice was incorrect. Similar "wrong-number" behavior can be detected from external systems or IoT devices based on connection times or direct feedback from the initiating or target device.

Other connection feedback monitor information might include short duration connections, disconnects, and immediately attempting to reconnect to a similar ambiguous target, and disconnecting and attempting to connect to a target with a more complete or unique description that corresponds to the original ambiguous input to CMCS 100.

Figure 4:
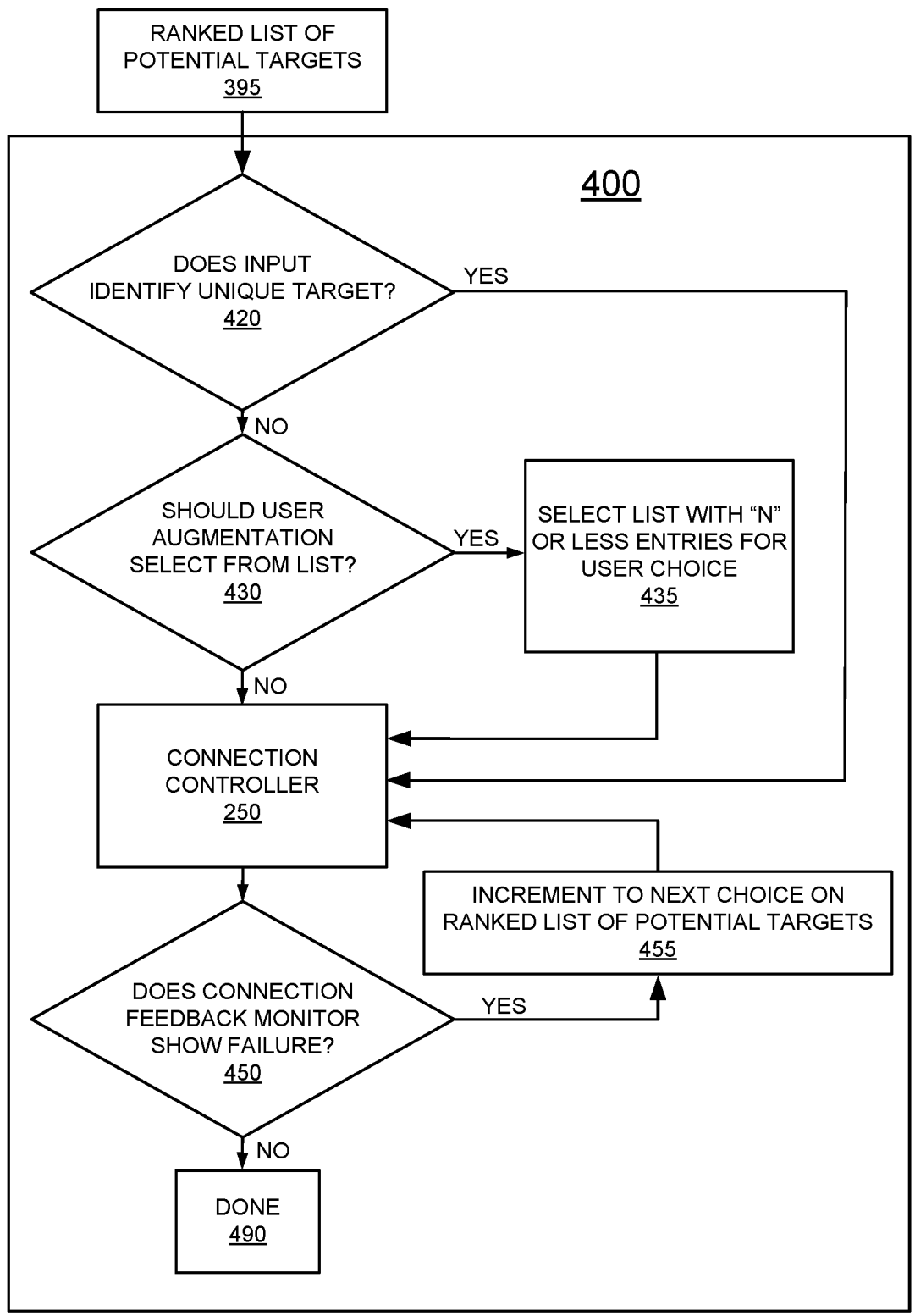
FIG. 4 shows an example flow chart for making the decisions used to command a connection controller to establish a link between initiator and one or more targets, in accordance with various embodiments.

System 100 may use one or more of the criteria described above to rank the possible targets and sends the ranked list of potential targets 395 to process 400 shown in FIG. 4. In some cases, there is a low confidence metric for the top-ranked target, and multiple possibilities still exist after the computer analysis is complete. If the ranked likelihood estimation confidence is below a pre-set or policy-controlled threshold, CMCS 100 may offer multiple targets to the initiator so that they can coordinate, verbally or through machine mechanisms, and in real time, who the initiating person is attempting to target. The person receiving the short list of possibilities then chooses the target manually.

In one embodiment, multiple high-likelihood targets would be connected in an ad-hoc group to have a conversation without disrupting other users of CMCS 100. This group of closely ranked targets can resolve the desired target through conversation and the unintended targets can drop out of the ad-hoc group. Once the non-targeted users drop off the ad-hoc group communication, CMCS 100 learns the intended target via the connection feedback monitor 280 and collects that data in the database of connection feedback data 295. If a similar ambiguous target name is used again, the who-remained-in-the-group information becomes part of the likelihood estimation on the next similar event. Of course, other information such as location and motion data 340, role and function data 320, time and date data 360, and prior connection data 310 can all contribute to the ranking process in the decision engine 390.

FIG. 4 shows an example flow chart for making the decisions used to command a connection controller to establish a link between initiator and one or more targets, in accordance with various embodiments.

The process 400 for narrowing the list of potential targets and deciding if human intervention is appropriate is shown in FIG. 4. The ranked list of potential targets 395 is delivered from process 300 as an input to process 400. If the ranked list of potential targets 395 contains only one unique target, the test at 420 commands the connection controller 250 to target a unique target as the desired target if there is a unique target. If the ranked list of potential targets 395 does not contain a single unique entry, then the policy controlling initiator augmentation is invoked at 430 to determine if a user/initiator should be offered a short list for choosing. For example, the policy may set a threshold at three potential targets for a short list (e.g., a user would select/disambiguate if there were two or three potential targets, but not if there were four or more). If the user/initiator is to disambiguate the target, the ranked list of possible targets is truncated to "N" or fewer entries where "N" is determined by the current list-policy running at 435. The list count, "N", may also be reduced below the policy-set level if the confidence metrics indicate a large difference between an upper set of targets and the lower set of targets. The user/initiator choice options may add additional information to assist the user/initiator in choosing the optimal target. For example, if the list presented to the user/initiator contain several "Bobs," the list may augment each "Bob" with supplemental information such as "Bob with a blue shirt," or "Bob in the housekeeping area," or "Bob with the blue shirt with long hair." Once the user/initiator has selected one or more items from the list at 435, the selection is passed to the connection controller 250 to initiate a communicative connection between the initiator and the selection which is the desired target.

If no user/initiator augmentation is determined at 430, the ranked list of potential targets 395 is passed to the connection controller 250. Connection controller 250 uses the policy of CMCS 100 to determine if it should communicatively connect the initiator to only the top-ranked target, or if it should communicatively connect the initiator to a multiple of top-ranked targets (i.e., an ad-hoc group).

Once the connection controller 250 commands the link be established from the initiating party or device to the target or multiple targets, connection feedback data 295 is used from the connection feedback monitor 280 for determining if the connection was successful at 450. If the connection monitor information indicates that the connection attempt has failed, then the ranked list of probable targets is incremented at 455 and another connection attempt is offered by connection controller 250. In some cases, incrementing the ranked list is inhibited by the computer policy and the connection attempt ends after the first failure. If no connection failure is indicated by the connection feedback monitor, the process ends 490.

Example Computer System Environment

Figure 5:
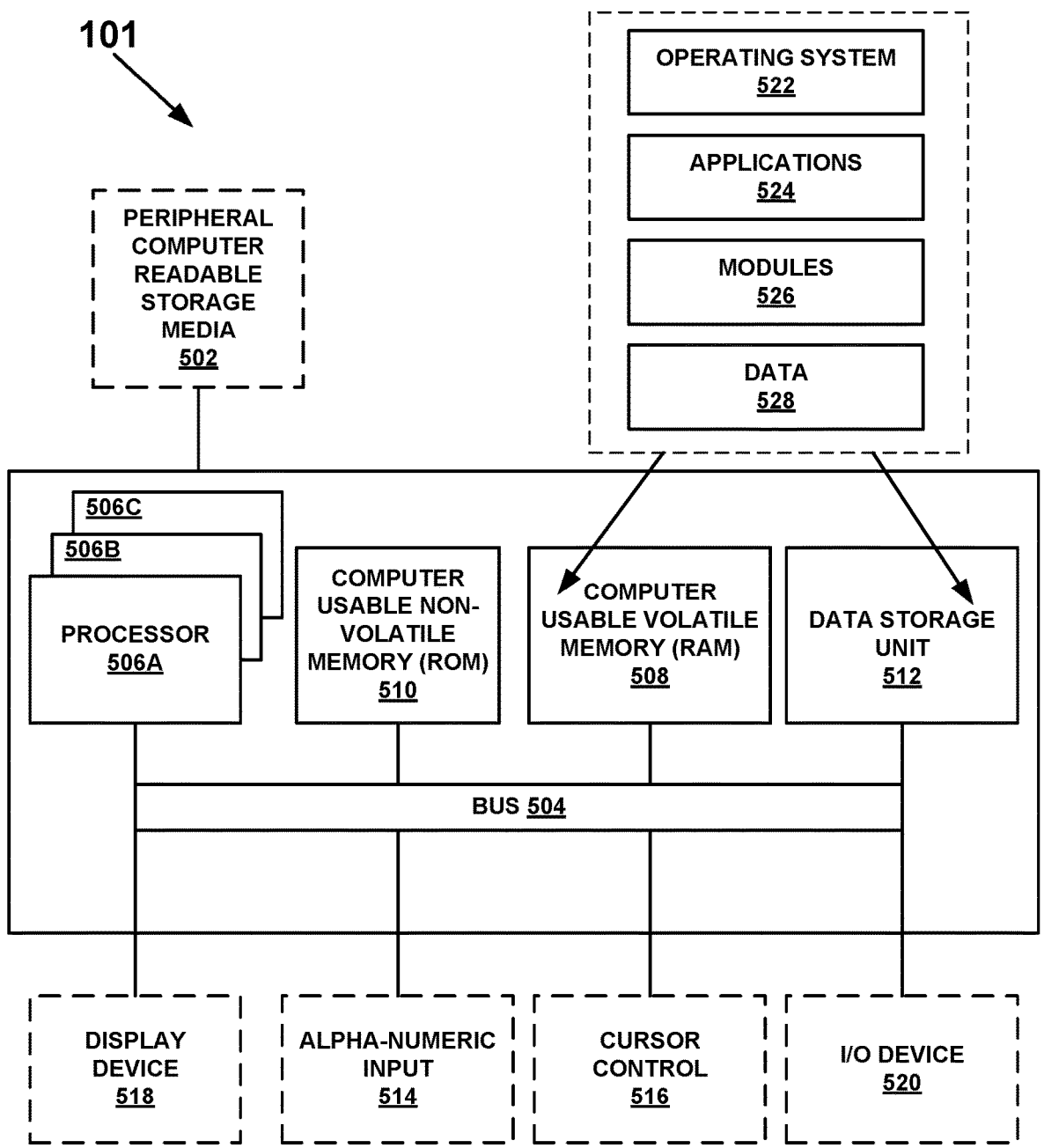
FIG. 5 is a block diagram of an example computer system with which, or upon which, various embodiments may be implemented.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 101) that can be used in accordance with or to implement various embodiments which are discussed herein. It is appreciated that computer system 101 of FIG. 5 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, hand-held computer systems, multi-media devices, computer mediated communication systems (e.g., CMCS 100) and the like. Computer system 101 of FIG. 5 is well adapted to having peripheral tangible computer-readable storage media 502 such as, for example, a floppy disk, a compact disc, digital versatile disc, other disc based storage, universal serial bus "thumb" drive, removable memory card, and the like coupled thereto. The tangible computer-readable storage media is non-transitory in nature.

Computer system 101 of FIG. 5 includes an address/data bus 504 for communicating information, and a processor 506A coupled with bus 504 for processing information and instructions. As depicted in FIG. 5, system 101 is also well suited to a multi-processor environment in which a plurality of processors 506A, 506B, and 506C are present. Conversely, system 101 is also well suited to having a single processor such as, for example, processor 506A. Processors 506A, 506B, and 506C may be any of various types of microprocessors. System 101 also includes data storage features such as a computer usable volatile memory 508, e.g., random access memory (RAM), coupled with bus 504 for storing information and instructions for processors 506A, 506B, and 506C. System 101 also includes computer usable non-volatile memory 510, e.g., read only memory (ROM), coupled with bus 504 for storing static information and instructions for processors 506A, 506B, and 506C. Also present in system 101 is a data storage unit 512 (e.g., a magnetic or optical disk and disk drive) coupled with bus 504 for storing information and instructions. System 101 also includes an optional alphanumeric input device 514 including alphanumeric and function keys coupled with bus 504 for communicating information and command selections to processor 506A or processors 506A, 506B, and 506C. System 101 also includes an optional cursor control device 516 coupled with bus 504 for communicating user input information and command selections to processor 506A or processors 506A, 506B, and 506C. In one embodiment, system 101 also includes an optional display device 518 coupled with bus 504 for displaying information.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 101 is also well suited to having a cursor directed by other means such as, for example, voice commands. System 101 also includes an I/O device 520 for coupling system 101 with external entities. For example, in one embodiment, I/O device 520 is a modem for enabling wired or wireless communications between system 101 and an external network such as, but not limited to, the Internet.

Referring still to FIG. 5, various other components are depicted for system 101. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer-readable storage media.

Example Methods of Operation

The following discussion sets forth in detail the operation of some example methods of operation of embodiments. With reference to FIG. 6, flow diagram 600 illustrates some example procedures used by various embodiments. Flow diagram 600 includes some procedures that, in various embodiments, are carried out by a processor under the control of computer-readable and computer-executable instructions. In this fashion, procedures described herein and in conjunction with flow diagram 600 is, or may be, implemented using a computer, in various embodiments. The computer-readable and computer-executable instructions can reside in any tangible computer-readable storage media. Some non-limiting examples of tangible computer-readable storage media include random access memory, read only memory, magnetic disks, and optical disks. The computer-readable and computer-executable instructions, which reside on tangible computer-readable storage media, are used to control or operate in conjunction with, for example, one or some combination of processor(s) of computer system 101. It is appreciated that the processor(s) may be physical or virtual or some combination (it should also be appreciated that a virtual processor is implemented on physical hardware). Although specific procedures are disclosed in flow diagram 600, such procedures are examples. That is, embodiments are well suited to performing various other procedures or variations of the procedures recited in flow diagram 600. Likewise, in some embodiments, the procedures in flow diagram 600 may be performed in an order different than presented and/or not all of the procedures described in one or more of these flow diagrams may be performed. It is further appreciated that procedures described in flow diagram 600 may be implemented in hardware, or a combination of hardware and firmware, or a combination of hardware and software.

FIG. 6 illustrates a flow diagram 600 of an example method of target disambiguation in a computer mediated communication system, such as CMCS 100, in accordance with various embodiments.

With reference to FIG. 6, at procedure 610 of flow diagram 600, in various embodiments, responsive to an initiator providing an ambiguous input for a communication interaction to the computer mediated communication system (e.g., computer mediated communication system 100), computer system (e.g., computer system 101) or a processor (e.g., processor 506A), parses the ambiguous input for information about a desired target of the communication interaction. The initiator may be a human user of the computer mediated computer system or a machine which communicates through the computer mediated communication system. The parsing may involve using speech recognition to recognize words in a verbal request from an initiator or using an application program interface to interpret a request from a machine initiator. The parsing extracts characteristics from the ambiguous input which provide clues to the desired target of the ambiguous input for communication interaction. Table 1 provides some examples of personal characteristics that may be maintained in a database within a memory (e.g., 508, 510) or storage (e.g., 512) of the computer mediated communication system, and which may also be parsed from an ambiguous input.

With continued reference to FIG. 6, at procedure 620 of flow diagram 600, in various embodiments, information about the desired target is matched against target data maintained by the computer mediated communication system (e.g., CMCS 100) to select a list of potential targets for the communication interaction. With reference to FIG. 2, in one embodiment, this matching may be performed by rules engine and matching algorithm 230 which may be executed by a computer system or processor thereof (e.g., computer system 101 and/or processor 506A).

With continued reference to FIG. 6, at procedure 630 of flow diagram 600, in various embodiments, likelihoods are computed of potential targets on the list of potential targets of being the desired target. The computing may be performed by a computer system or processor thereof (e.g., computer system 101 and/or processor 506A). With reference to Figure and FIG. 3, a list of potential targets for additional analysis 246 is provided to process 300, where a variety of weighting and policy metrics are applied to parsed information about the potential targets by decision engine 390 to determine their respective likelihoods of being the desired target of the initiator. As illustrated in FIG. 3, decision engine 390 applies policy and weighting metrics via module 290 to a variety of characteristics (310, 320, 330, 340, 350, 360, 370, 380 and/or the like) that may match characteristics parsed from the initiator's ambiguous input and/or to intents attributed to a message or command (e.g., 385) that is parsed from the initiator's ambiguous input. In some embodiments, decision engine 390 may be implemented by a computer system or processor thereof (e.g., computer system 101 and/or processor 506A).

In some embodiments, the computation of a likelihood of a potential target of the potential targets being the desired target may incorporate feedback (e.g., connection feedback data 295) from previous communication interaction attempts by the initiator, such that a presence of previous communication interaction attempts by the initiator increases the likelihood and a greater number of communication interaction attempts by the initiator increases the likelihood more than a lesser number of communication attempts.

In some embodiments, the computation of a likelihood of a potential target of the potential targets being the desired target may incorporate call duration information (e.g., information 310) associated with the potential target, such that an increased duration of calls increases the likelihood of the potential target being the desired target.

In some embodiments, the computation of a likelihood of a potential target of the potential targets being the desired target may incorporate behavioral data 330 in the form of a use/non-use metric of the computer mediated communication system (e.g., CMCS 100) associated with the potential target, such that the potential target having used the computer mediated communication system increases a likelihood of the potential target being the desired target and the potential target having not having used the computer mediated communication system decreases a likelihood of the potential target being the desired target.

In some embodiments, the computation of a likelihood of a potential target of the potential targets being the desired target may incorporate behavioral data 330 in the form of a frequency of use metric of the computer mediated communication system (e.g., CMCS 100) associated with the potential target, such that increased frequency of use by the potential target increases a likelihood of the potential target being the desired target.

In some embodiments, the computation of a likelihood of a potential target of the potential targets being the desired target may incorporate behavioral data 330 in the form of a recency of use metric of the computer mediated communication system (e.g., CMCS 100) associated with the potential target, such that a more recent use of the computer mediated communication system by the potential target increases the likelihood of the potential target being the desired target more than a less recent use of the computer mediated communication system.

In some embodiments, the computation of a likelihood of a potential target of the potential targets being the desired target may incorporate behavioral data 330 in the form of information about a recency of the potential target leaving a message for the initiator via the computer mediated communication system (e.g., CMCS 100), such that the message being left more recently by the initiator increases the likelihood more than the message being left less recently by the initiator.

In some embodiments, the computation of a likelihood of a potential target of the potential targets being the desired target may incorporate behavioral data 330 in the form of information about a recency of a response to a request and response event by the potential target, such that the response being made more recently by the potential target increases the likelihood more than the response being made less recently by the potential target.

In some embodiments, the computation of a likelihood of a potential target of the potential targets being the desired target may incorporate behavioral data 330 in the form of information about a recency of a request for a request and response event by the potential target, such that the request being made more recently by the potential target increases the likelihood more than the response being made less recently by the potential target.

In some embodiments, the computation of a likelihood of a potential target of the potential targets being the desired target may role, group, and function data 330 in the form of information about a department of assignment of the initiator to adjust the likelihood of the potential target, wherein the department of assignment is one of a plurality of departments of a business employing the computer mediated communication system (e.g., CMCS 100).

In some embodiments, the computation of a likelihood of a potential target of the potential targets being the desired target may time, day, date, and/or season data 360 in the form of information about one of the current time, day month, and season to adjust the likelihood of the potential target.

In some embodiments, the computation of a likelihood of a potential target of the potential targets being the desired target may incorporate personal attribute data 370 in the form of information about a preferred language of the initiator to adjust the likelihood of the potential target.

In some embodiments, the computation of a likelihood of a potential target of the potential targets being the desired target may incorporate personal attribute data 370 in the form of information about a personal characteristic of the potential target to adjust the likelihood of the potential target.

In some embodiments, the computation of a likelihood of a potential target of the potential targets being the desired target may incorporate location data 340 in the form of information about a current physical location of the potential target to adjust the likelihood of the potential target, such that the current physical location being physically closer to the initiator than that of another of the potential targets increases the likelihood.

In some embodiments, the computation of a likelihood of a potential target of the potential targets being the desired target may incorporate a combination of location data 340 and role, group, function data 320 about a current physical location of the potential target to adjust the likelihood of the potential target, such that the current physical location of the potential target corresponding to the one of a department name and a responsibility associated with the ambiguous input increases the likelihood.

With continued reference to FIG. 6, at procedure 640 of flow diagram 600, in various embodiments, the potential targets are ranked based on their respective likelihoods of being the desired target, to achieve a ranked list of potential targets. With reference to FIG. 3, after computing the likelihoods, decision engine 390 may rank order the potential targets based on their computed likelihood to create and output a ranked list of potential targets 395. In some embodiments, decision engine 390 may be implemented by a computer system or processor thereof (e.g., computer system 101 and/or processor 506A). The rank ordered list of potential targets 395 is provided as an input to process 400 illustrated in FIG. 4.

In some embodiments, decision engine 390 may employ connection feedback data 295 to adjust a weighting used in ranking of the potential targets. The connection feedback data 295 is collected by the computer mediated communication system (e.g., CMCS 100) via monitoring of communication connections, such that the weighting is adjusted based on success and failure data of accurately making connections between initiators and desired targets. In some embodiments, this monitoring is performed by connection feedback monitor 280, which may be implemented by a computer system or processor thereof (e.g., computer system 101 and/or processor 506A).

With continued reference to FIG. 6, at procedure 650 of flow diagram 600, in various embodiments, the ambiguous input is disambiguated by communicatively coupling the initiator with at least one of the potential targets based on a ranking in the ranked list. With reference to FIG. 4, process 400 describes several techniques for achieving this disambiguation and communicative coupling. Process 400 may be implemented by a computer system or processor thereof (e.g., computer system 101 and/or processor 506A). Equations 1-4 describe some example equations for computing a likelihood and a rank of associated with a potential target being the desired target of an initiators ambiguous input.

In some embodiments, the disambiguation and communicative coupling may comprise implementing an ad-hoc group communication from the initiator to a plurality of the potential targets based on respective rankings of the plurality of the potential targets being within a threshold of difference of one another. Consider an example where the threshold is 10%. In this example, the top three potential targets on the ranked list of potential targets 395 may be communicatively coupled simultaneously with the initiator when their computed likelihoods are within ten percent of one another. The threshold may be preset and/or adjustable by the enterprise user of the computer mediated communication system (e.g., CMCS 100). The members of the ad-hoc group are then able to down-select the ad-hoc group to the desired target of the initiator by dropping out of the ad-hoc group (e.g., terminating communication) if they are not the desired target of the initiator.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer mediated communication system comprising:
a plurality of communication devices;
a wireless transceiver; and
a computer system configured to wirelessly communicate with the plurality of communication devices via the wireless transceiver and to mediate communications among the plurality of communication devices, the computer system comprising:
a memory; and
a processor coupled with the memory and configured to:
parse, in response to an initiator providing an ambiguous input for a communication interaction to the computer mediated communication system, the ambiguous input for information about a desired target of the communication interaction;
match the information about the desired target against target data maintained by the computer mediated communication system to select a list of potential targets for the communication interaction;
compute likelihoods of potential targets on the list of potential targets of being the desired target;
rank the potential targets based on their respective likelihoods of being the desired target to achieve a ranked list of potential targets; and
disambiguate the ambiguous input by communicatively coupling the initiator with at least one of the potential targets based on a ranking in the ranked list.

2. The computer mediated communication system of claim 1, wherein the processor configured to compute likelihoods of potential targets on the list of potential targets of being the desired target comprises the processor configured to:
incorporate, in the computation of a likelihood of a potential target of the potential targets being the desired target, feedback from previous communication interaction attempts by the initiator, such that a presence of previous communication interaction attempts by the initiator increases the likelihood and a greater number of communication interaction attempts by the initiator increases the likelihood more than a lesser number of communication attempts.

3. The computer mediated communication system of claim 1 wherein the processor configured to compute likelihoods of potential targets on the list of potential targets of being the desired target comprises the processor configured to:
incorporate, in the computation of a likelihood of a potential target of the potential targets being the desired target, call duration information associated with the potential target, such that an increased duration of calls increases the likelihood of the potential target being the desired target.

4. The computer mediated communication system of claim 1, wherein the processor configured to compute likelihoods of potential targets on the list of potential targets of being the desired target comprises the processor configured to:
incorporate, in the computation of a likelihood of a potential target of the potential targets being the desired target, a frequency of use metric of the computer mediated communication system associated with the potential target, such that increased frequency of use by the potential target increases a likelihood of the potential target being the desired target.

5. The computer mediated communication system of claim 1, wherein the processor configured to compute likelihoods of potential targets on the list of potential targets of being the desired target comprises the processor configured to:
incorporate, in the computation of a likelihood of a potential target of the potential targets being the desired target, a recency of use metric of the computer mediated communication system associated with the potential target, such that a more recent use of the computer mediated communication system by the potential target increases the likelihood of the potential target being the desired target more than a less recent use of the computer mediated communication system.

6. The computer mediated communication system of claim 1, wherein the processor configured to compute likelihoods of potential targets on the list of potential targets of being the desired target comprises the processor configured to:
incorporate, in the computation of a likelihood of a potential target of the potential targets being the desired target, a recency of the potential target leaving a message for the initiator via the computer mediated communication system, such that the message being left more recently by the initiator increases the likelihood more than the message being left less recently by the initiator.

7. The computer mediated communication system of claim 1, wherein the processor configured to compute likelihoods of potential targets on the list of potential targets of being the desired target comprises the processor configured to:
incorporate, in the computation of a likelihood of a potential target of the potential targets being the desired target, information about a recency of a response to a request and response event by the potential target, such that the response being made more recently by the potential target increases the likelihood more than the response being made less recently by the potential target.

8. The computer mediated communication system of claim 1, wherein the processor configured to compute likelihoods of potential targets on the list of potential targets of being the desired target comprises the processor configured to:
incorporate, in the computation of a likelihood of a potential target of the potential targets being the desired target, information about a department of assignment of the initiator to adjust the likelihood of the potential target, wherein the department of assignment is one of a plurality of departments of a business employing the computer mediated communication system.

9. The computer mediated communication system of claim 1, wherein the processor configured to compute likelihoods of potential targets on the list of potential targets of being the desired target comprises the processor configured to:
incorporate, in the computation of a likelihood of a potential target of the potential targets being the desired target, information about a personal characteristic of the potential target to adjust the likelihood of the potential target.

10. The computer mediated communication system of claim 1, wherein the processor configured to compute likelihoods of potential targets on the list of potential targets of being the desired target comprises the processor configured to:
incorporate, in the computation of a likelihood of a potential target of the potential targets being the desired target, information about a current physical location of the potential target to adjust the likelihood of the potential target, such that the current physical location of the potential targets correspond to the one of a department name and a responsibility associated with the ambiguous input increases the likelihood.

11. The computer mediated communication system of claim 1, wherein the processor configured to rank the potential targets based on their respective likelihoods of being the desired target to achieve a ranked list of potential targets comprises the processor configured to:
employ connection feedback data to adjust a weighting used in ranking of the potential targets, wherein the connection feedback data is collected by the computer mediated communication system via monitoring of communication connections, such that the weighting is adjusted based on success and failure data of accurately making connections between initiators and desired targets.

12. The computer mediated communication system of claim 1, wherein the processor configured to disambiguate the ambiguous input by communicatively coupling the initiator with at least one of the potential targets based on a ranking within the ranked list comprises the processor configured to:
implement an ad-hoc group communication to a plurality of the potential targets based on respective rankings of the plurality of the potential targets being within a threshold of difference, such that members of the ad-hoc group down-select the ad-hoc group to the desired target by dropping out of the ad-hoc group if they are not the desired target.

13. A method of target disambiguation in computer mediated communication system, the method comprising:
responsive to an initiator providing an ambiguous input for a communication interaction to the computer mediated communication system, parsing the ambiguous input for information about a desired target of the communication interaction;
matching the information about the desired target against target data maintained by the computer mediated communication system to select a list of potential targets for the communication interaction;
computing likelihoods of potential targets on the list of potential targets of being the desired target;
ranking the potential targets based on their respective likelihoods of being the desired target to achieve a ranked list of potential targets; and
disambiguating the ambiguous input by communicatively coupling the initiator with at least one of the potential targets based on a ranking within the ranked list.

14. The method as recited in claim 13, wherein the computing likelihoods of potential targets on the list of potential targets of being the desired target comprises:
incorporating, in the computation of a likelihood of a potential target of the potential targets being the desired target, feedback from previous communication interaction attempts by the initiator, such that a presence of previous communication interaction attempts by the initiator increases the likelihood and a greater number of communication interaction attempts by the initiator increases the likelihood more than a lesser number of communication attempts.

15. The method as recited in claim 13, wherein the computing likelihoods of potential targets on the list of potential targets of being the desired target comprises:
incorporating, in the computation of a likelihood of a potential target of the potential targets being the desired target, call duration information associated with the potential target, such that an increased duration of calls increases the likelihood of the potential target being the desired target.

16. The method as recited in claim 13, wherein the computing likelihoods of potential targets on the list of potential targets of being the desired target comprises:
incorporating, in the computation of a likelihood of a potential target of the potential targets being the desired target, a frequency of use metric of the computer mediated communication system associated with the potential target, such that increased frequency of use by the potential target increases a likelihood of the potential target being the desired target.

17. The method as recited in claim 13, wherein the computing likelihoods of potential targets on the list of potential targets of being the desired target comprises:
incorporating, in the computation of a likelihood of a potential target of the potential targets being the desired target, a recency of use metric of the computer mediated communication system associated with the potential target, such that a more recent use of the computer mediated communication system by the potential target increases the likelihood of the potential target being the desired target more than a less recent use of the computer mediated communication system.

18. The method as recited in claim 13, wherein the computing likelihoods of potential targets on the list of potential targets of being the desired target comprises:
incorporating, in the computation of a likelihood of a potential target of the potential targets being the desired target, a recency of the potential target leaving a message for the initiator via the computer mediated communication system, such that the message being left more recently by the initiator increases the likelihood more than the message being left less recently by the initiator.

19. The method as recited in claim 13, wherein the computing likelihoods of potential targets on the list of potential targets of being the desired target comprises:
incorporating, in the computation of a likelihood of a potential target of the potential targets being the desired target, information about a recency of a response to a request and response event by the potential target, such that the response being made more recently by the potential target increases the likelihood more than the response being made less recently by the potential target.

20. The method as recited in claim 13, wherein the computing likelihoods of potential targets on the list of potential targets of being the desired target comprises:
incorporating, in the computation of a likelihood of a potential target of the potential targets being the desired target, information about a department of assignment of the initiator to adjust the likelihood of the potential target, wherein the department of assignment is one of a plurality of departments of a business employing the computer mediated communication system.

21. The method as recited in claim 13, wherein the computing likelihoods of potential targets on the list of potential targets of being the desired target comprises:
incorporating, in the computation of a likelihood of a potential target of the potential targets being the desired target, information about a personal characteristic of the potential target to adjust the likelihood of the potential target.

22. The method as recited in claim 13, wherein the computing likelihoods of potential targets on the list of potential targets of being the desired target comprises:
incorporating, in the computation of a likelihood of a potential target of the potential targets being the desired target, information about a current physical location of the potential target to adjust the likelihood of the potential target, such that the current physical location of the potential target corresponding to the one of a department name and a responsibility associated with the ambiguous input increases the likelihood.

23. The method as recited in claim 13, wherein the ranking the potential targets based on their respective likelihoods of being the desired target to achieve a ranked list of potential targets comprises:
employing connection feedback data to adjust a weighting used in ranking of the potential targets, wherein the connection feedback data is collected by the computer mediated communication system via monitoring of communication connections, such that the weighting is adjusted based on success and failure data of accurately making connections between initiators and desired targets.

24. The method as recited in claim 13, wherein the disambiguating the ambiguous input by communicatively coupling the initiator with at least one of the potential targets based on a ranking within the ranked list comprises:
implementing an ad-hoc group communication to a plurality of the potential targets based on respective rankings of the plurality of the potential targets being within a threshold of difference, such that members of the ad-hoc group down-select the ad-hoc group to the desired target by dropping out of the ad-hoc group if they are not the desired target.

25. A non-transitory computer readable storage medium comprising instructions embodied thereon which, when executed, cause a processor to perform a method of target disambiguation in computer mediated communication system, the method comprising:
responsive to an initiator providing an ambiguous input for a communication interaction to the computer mediated communication system, parsing the ambiguous input for information about a desired target of the communication interaction;
matching the information about the desired target against target data maintained by the computer mediated communication system to select a list of potential targets for the communication interaction;
computing likelihoods of potential targets on the list of potential targets of being the desired target;
ranking the potential targets based on their respective likelihoods of being the desired target to achieve a ranked list of potential targets; and
disambiguating the ambiguous input by communicatively coupling the initiator with at least one of the potential targets based on a ranking within the ranked list.

* * * * *